United States Patent [19]

Neefe

[11] 4,179,484
[45] Dec. 18, 1979

[54] METHOD OF MAKING TORIC LENSES

[76] Inventor: Charles W. Neefe, Box 429, Big Spring, Tex. 79720

[21] Appl. No.: 3,724

[22] Filed: Jan. 15, 1979

Related U.S. Application Data

[63] Continuation-in-part of Ser. No. 874,934, Feb. 3, 1978, Pat. No. 4,150,073, which is a continuation-in-part of Ser. No. 793,388, May 25, 1977, abandoned.

[51] Int. Cl.$^2$ ............................................. B29D 11/00
[52] U.S. Cl. ........................................ 264/1; 264/219; 264/220; 264/313
[58] Field of Search .................. 264/1, 219, 220, 313; 425/808

[56] References Cited

U.S. PATENT DOCUMENTS

| | | | |
|---|---|---|---|
| 3,422,168 | 1/1969 | Bowser | 264/1 |
| 3,876,734 | 4/1975 | Howden | 264/1 |
| 3,903,218 | 9/1975 | Humphrey | 264/1 |

Primary Examiner—James B. Lowe

[57] ABSTRACT

A method of making plastic toric lenses by casting a liquid monomer in a container having the required toric curve on the bottom of the container, polymerizing the monomer to form a solid having a toric optical surface formed within the container and cutting a second optical surface on the solid lens material with the container supporting the lens material during the cutting and polishing operation.

The container or mold used for casting the lens is made by applying pressure to two opposing sides of a heat softened resinous cylinder to change the shape of the cylinder from a circle to an ellipse, and to change the bottom shape of the cylinder from a spherical surface to a toric surface. The cylinder is then allowed to cool before the pressure is removed.

2 Claims, 4 Drawing Figures

METHOD OF MAKING TORIC LENSES

Continuation-in-part of application Ser. No. 874,934, filed Feb. 3, 1978, now U.S. Pat. No. 4,150,073, entitled; A METHOD OF CONTROLLING THE ADHESION OF A MOLDED PLASTIC LENS, which is a continuation-in-part of application Ser. No. 793,388, filed May 25, 1977, now abandoned, entitled; A METHOD OF MAKING HIGH QUALITY PLASTIC LENSES.

FIELD OF THE INVENTION

The use of plastic materials for making optical lenses has increased rapidly for the past ten years. This is due to the availability of better plastic materials and the physical advantages of the plastic resins for specific applications such as ophthamic lenses. To technology for the production of high quality plastic lenses has not kept pace with the material supply industry. It is important to advance both areas if the full potential is to be realized.

Plastic lenses offer many advantages over glass lenses. They are much lighter in weight and resist breakage. The cost of making high quality lenses has been high due to the problems caused by the shrinkage of the monomer when polymerized, which often breaks the expensive molds.

STATE OF THE ART

The current lens molds are fabricated from steel or glass, each mold is individually ground and polished to the required specifications. To achieve accurate reproduction of the bifocal and toric molds is most difficult and expensive.

An object is to provide a process for making inexpensive toric molds which may be made to identical specifications.

Another object is to provide a process whereby standard masters may be used to produce a large quantity of replica molds.

The replica mold also serves as a holding fixture during the cutting and polishing of the second optical surface.

THE LENSES ARE MADE AS FOLLOWS

A master positive mold is made from glass or stainless steel or other materials which will withstand the molding temperatures.

DESCRIPTION OF THE PREFERRED EMBODIMENTS

Figure 1:
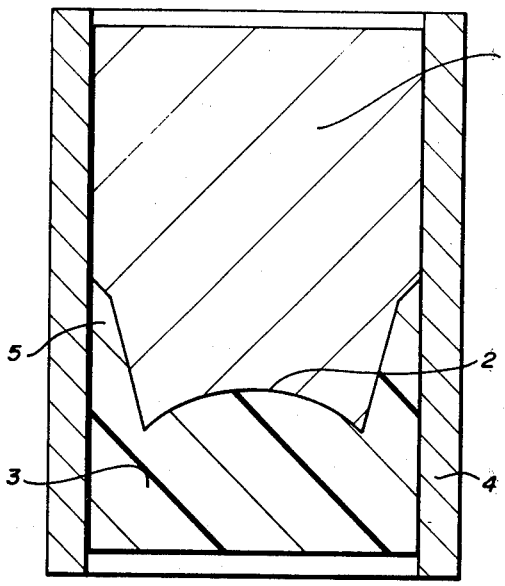
FIG. 1 shows the sleeve, steel mold and resinous mold material.
Figure 2:
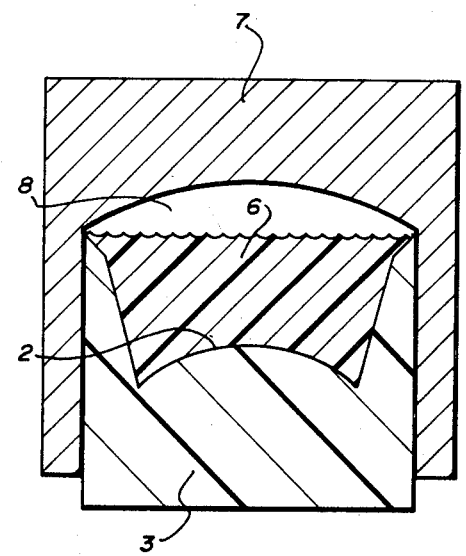
FIG. 2 shows the resinous mold containing the liquid lens monomer with the cover in place.

The master mold, 1 FIG. 1, is placed in a sleeve, 4 FIG. 1, a molding grade of a resinous material such as polyimide, polycarbonate, polymethylpentene, polyethylene, polypropylene, nylon or other molding material is placed in the sleeve, 4 FIG. 1. The sleeve and it's contents are heated to the softening point of the molding material, pressure is applied to form the lens mold, 3 FIG. 1. The sides of the master mold, 1 FIG. 1, have been cut to a smaller diameter to provide the opening, 5 FIG. 1. When sufficient heat and pressure have been applied, the molding compound, 3, will fill the area around the positive mold, 1, forming a cup-like cavity with a curved optical surface, 2 FIG. 1, at the bottom. Either injection or compression molding may be used to produce the lens molding container. The lens container, 3 FIG. 1, is removed from the molding sleeve, 4 FIG. 1, and the optical mold, 1 FIG. 1, is also removed. The resinous mold, 3 FIG. 1, is placed in an oven and heated to a temperature below the distortion temperature of the resinous material. The working temperature will be below the glass transition temperature and below the temperature at which changes in the curvature of the optical surface, 2 FIGS. 1 and 2, occur. The most desirable temperature is 7° C. below the temperature at which a change in the curvature of the optical surface, 2 FIGS. 1 and 2, occurs. The resinous mold, 3 FIGS. 1 and 2, is heated to the working temperature and pressure is applied to opposing exterior sides of the mold, distorting the shape of the mold, including the optical surface, 2 FIGS. 1 and 2, which assumes a toric shape. Pressure is applied to the sides of the heated cylinder, 3 FIGS. 1 and 2, changing the shape from a round cylinder to an ellipse. The spherical surface, 2 FIGS. 1 and 2, will change to a toroidal shape when the cylinder is flattened to an ellipse. A toric surface intersects a sphere on an ellipse, therefore, if a circular segment of a sphere is distorted to an ellipse the spherical surface becomes a toric surface. An elliptical segment of a sphere will also become a toric if the ellipse is forced to a circle. The difference in radius between the two toric meridians is not of a great magnitude, ranging in linear progression as follows: 0.25 diopter toric = 0.03 millimeter difference in radius, 0.50 diopter toric = 0.06 millimeter difference in radius, 1.00 diopter toric = 0.12 millimeter difference in radius, and 2.00 diopter toric = 0.24 millimeter difference in radius. The above degree of difference in radius is for a refractive index of 1.488 at the D sodium line and an 8.00 m/m spherical radius. A diopter is the reciprocal of the focal length expressed in meters. The distortion required is of a rather small degree compared to the size of the componenets involved. The pressure required to effect the desired distortion is applied to the heated resinous lens mold and maintained until the resinous mold is allowed to cool to ambient temperature. After cooling, the pressure is removed and the toric present on surface, 2 FIG. 2, is measured and confirmed before the liquid monomer, 6 FIG. 2, is added.

CASTING THE TORIC OPTICAL SURFACE

A liquid or syrup monomer material containing a suitable catalyst, 6 FIG. 2, is placed over the toric optical surface, 2 FIG. 2, and covered to prevent evaporation with a cover, 7 FIG. 2, an air space, 8 FIG. 2, is provided. The liquid monomer is polymerized to form a solid. Microwave energy or heat may be used to speed the polymerization process. Thermosetting and cross-linked materials may be used to produce lenses which are dimensionally stable. This process is suitable for the production of toric soft contact lenses which cannot be made by compression or injection molding techniques.

CUTTING THE SECOND OPTICAL SURFACE

Figure 3:
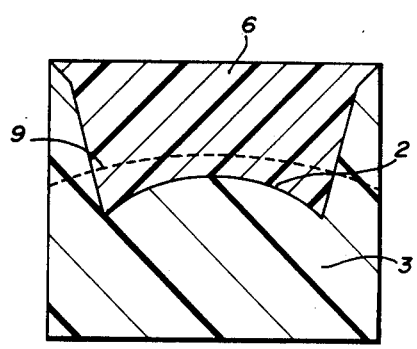
FIG. 3 shows the polymerized lens material with a toric optical surface molded on the resinous mold.
Figure 4:
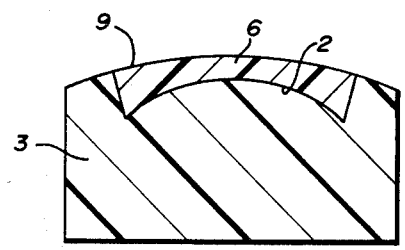
FIG. 4 shows the lens with the second optical surface cut and in the resinous mold.

It is not necessary to remove the hardened plastic lens material, 6 FIG. 3, from the mold, 3 FIG. 3, before cutting the convex curve, 9 FIG. 3. The mold, 3 FIG. 3, may be placed in a suitable lathe and curvature, 9 FIG. 3, cut and polished. The finished lens, 6 FIG. 4, having the molded toric concave surface, 2, and the convex curvature, 9, which was cut and polished without being removed from the disposable mold, 3 FIG. 4. The cup-like device has served as a container for the monomer, 6 FIG. 2, provided the molded toric optical surface which for contact lens production may be two or more toric segments providing the required optical zone, peripheral curves and lens diameter. The cup-like mold, 3 FIG. 3, also serves as the holding block to facilitate cutting to the required thickness. The thickness of the cup bottom may be measured before adding the liquid monomer and measurements may be taken during the cutting operation and the lens thickness determined by subtracting the thickness of the cut bottom. The cup, 3 FIG. 3, which adheres strongly to the lens also serves as a holding fixture during the polishing operation. After the toric lens is processed to the required specifications, the toric lens is removed by sharply flexing the holding fixture, 3 FIG. 4, separating the finished toric lens from it's support.

Various modifications can be made without departing from the spirit of this invention or the scope of the appended claims. The constants set forth in the disclosure are given as examples and are in now way final or binding. In view of the above, it will be seen that the several objects of the invention are achieved and other advantages are obtained. As many changes could be made in the above construction and method without departing from the scope of the invention, it is intended that all matter contained in the above description shall be interpreted as illustrative and not in a limiting sense.

That which is claimed is:

1. A method of making toric plastic lenses comprising the steps of; providing a positive lens mold having a first spherical surface curvature, and a second surface corresponding to the edge surface of the finished lens with the second surface extending from the first surface curvature a distance greater than the height of the thickness of the lens, forming a negative mold from the positive mold by applying a heat softened resinous material against the first surface curvature and the second surface of the positive mold to form an open top cylinder from the resinous material with an image of the first spherical surface curvature as the bottom of the cylinder and the image of the second surface as the walls of the cylinder, removing the positive lens mold from the negative lens mold, applying sufficient heat to soften the resinous cylinder, applying pressure to two opposing sides of the resinous cylinder to change the shape of the cylinder from a circle to an ellipse and to change the spherical curve present in the bottom of the cylinder from a sphere to toric, allowing the resinous cylinder to cool before removing the pressure, filling the resinous negative mold with a liquid monomer lens material, allowing the liquid monomer lens material to polymerize to form a solid monlithic mass within the resinous negative mold having one finished toric optical surface molded by the toric surface curvature formed in the bottom of the resinous mold, cutting and polishing a second optical surface on the polymerized lens material while the lens material is supported within the resinous mold adjacent to the lens material, and removing the toric lens from the resinous cylinder of the negative mold.

2. A method as in claim 1 wherein an elliptical cylinder is forced to a circle to change the spherical surface to a toric surface.

* * * * *